United States Patent Office 3,316,224
Patented Apr. 25, 1967

3,316,224
PROCESS FOR PREPARING POLYMERS FROM OPEN-CHAIN N-VINYL AMIDES IN AN AQUEOUS MEDIUM WITH A CATALYST COMPRISING HYDROGEN PEROXIDE AND A NITROGEN COMPOUND
Herbert Bestian and Dieter Ulmschneider, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 10, 1962, Ser. No. 208,927
Claims priority, application Germany, July 13, 1961, F 34,427
7 Claims. (Cl. 260—85.5)

The present invention relates to a process for polymerizing open-chain N-vinyl amides.

We have found that open-chain N-vinyl amides can be converted in an aqueous solution or in an aqueous dispersion into polymers of high molecular weight in the presence of a catalyst system comprising $H_2O_2$ and an inorganic or an organic nitrogen-containing compound giving a basic reaction.

As suitable nitrogen-containing compounds having a basic reaction may be mentioned by way of example: primary, secondary and tertiary aliphatic and cycloaliphatic amines containing 1 to 8 carbon atoms in straight or branched chain, for example, dimethyl amine, triethyl amine, diisobutyl amine, trioctyl amine, ethylene diamine, 1,6-hexamethylene diamine or N-methyl cyclohexyl amine. In the catalyst system inorganic compounds like those containing 1 to 2 nitrogen atoms each of which is bound to at least two hydrogen atoms, for example, ammonia and hydrazine, and organic compounds like primary aliphatic monoamines containing 1 to 5 carbon atoms in straight or branched chain, for example, methyl amine, ethyl amine, butyl amine, pentyl amine and 2-ethyl-propyl amine are used with particular advantage.

Mixtures of different nitrogen-containing compounds may also be used. The quantity of $H_2O_2$ to be used is in general within the range of 0.001 to 10% by weight, preferably 0.001 to 3% by weight, calculated on the monomer, and the quantity of nitrogen-containing compounds to be used is in general within the range of 0.0001 to 10% by weight, preferably 0.001 to 5% by weight, likewise calculated on the monomer.

In the polymerization process according to the invention the heat of reaction can well be dissipated and, owing to the possibility of varying the quantity of $H_2O_2$ used, desired medium length of chain can exactly be adjusted. The smaller the quantity of $H_2O_2$ used the higher the K value of the polymers obtained. The process according to the invention also enables different N-vinyl amides to be copolymerized or at least one N-vinyl amide to be copolymerized with another monomer capable of being polymerized under the action of a free radical polymerization catalyst. In the latter case, at least 10%, calculated on the total weight of the mixture, of N-vinyl amides should be present in the mixture of monomers subjected to polymerization.

As suitable N-vinyl amides to be polymerized by the process according to the invention there may be mentioned by way of example those of the following formula

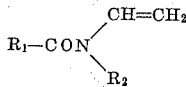

in which $R_1$ and $R_2$ represent monovalent radicals of saturated aliphatic hydrocarbons containing 1 to 5 carbon atoms, or a hydrogen radical. The radicals $R_1$ and $R_2$ may be identical or different from one another.

As individual examples of N-vinyl amides which may be polymerized by the process according to the invention there may be mentioned: N-vinyl acetamide, N-vinyl-N-methyl formamide, N-vinyl-N-methyl-acetamide, N-vinyl propionamide, N-vinyl-N-methyl propionamide, N-vinyl-N-ethyl acetamide and N-vinyl-N-methyl-i-butyramide. Suitable copolymerization components are vinyl ethers, the alkyl radical of which contains 1 to 5 carbon atoms; vinyl lactams such as vinyl pyrrolidone and N-vinyl-caprolactam; vinyl halides such as vinyl chloride; esters of vinyl alcohol and monovalent saturated aliphatic carboxylic acids containing 1 to 18 carbon atoms, for example, vinyl acetate, vinyl propionate, vinyl butyrate and vinyl stearate. There may also be used derivatives of acrylic acid or methacrylic acid, for example esters of acrylic acid or methacrylic acid and aliphatic monohydric saturated alcohols containing 1 to 8 carbon atoms, and the unsubstituted or substituted amide of acrylic acid or methacrylic acid, and acrylonitrile and methacrylonitrile.

The N-vinyl amides are suitably used in the form of an aqueous solution or dispersion of 10 to 60% strength. Solutions and dispersions having a higher degree of dilution or of concentration may also be suitable. The N-vinyl amides which are not readily soluble in water, for example, N-vinyl-N-methyl propionamide, N-vinyl-N-ethyl acetamide and N-vinyl-N-methyl-i-butyramide, can be polymerized in one phase or in a system comprising two phases. In cases in which polymerization is carried out in one phase it may be necessary to add a solution promoter, for example, an organic water-soluble solvent such as methanol, ethanol, propanol or acetone. In a polymerization which in the beginning comprises two phases, the organic phase disappears as the extent of conversion increases, since the polymeric N-vinyl-amides are much better soluble in water than the monomers.

The reaction temperature may be within the range of about 0° C. to 100° C. In order to increase the speed of polymerization and to shorten the latent period it is advantageous to carry out the polymerization in the absence of oxygen, for example, under an atmosphere of nitrogen, carbon dioxide or a noble gas, for example, argon. This is especially advisable in cases in which a temperature below 70° C. is used. Since in an acid solution the N-vinyl amides readily undergo hydrolysis which is coupled with the formation of acetaldehyde the pH value shall in general be at least 7.

The open-chain N-vinylamide polymers are soluble in water and in some organic solvents, for example, alcohols and hydrocarbon halides. From solutions of the polymers colourless, hard films are obtained.

The polymers prepared according to the invention can be used for stripping vat dyestuffs, as thickeners, adhesives and hair styling composition.

The following examples serve to illustrate the invention but they are not intended to limit it thereto.

EXAMPLE 1

In an atmosphere of nitrogen a solution of 20 grams of N-vinyl acetamide in 47 cc. of water was polymerized at 50° C. while 0.12 cc. of hydrogen peroxide (30% strength) and 0.3 cc. of ammonia (20% strength) were added, the hydrogen peroxide being added in 4 equal portions at intervals of 3 hours. After 15 hours a clear, colourless solution of a polymer having a K value of 88.5 and a reduced viscosity of 3.0 (determined in an aqueous solution of 1% strength, at 25° C.) was obtained.

EXAMPLE 2

The following table illustrates the influence of the concentration of hydrogen peroxide on the molecular weight of the polymers obtained by the polymerization, the polymerization of N-vinyl-N-methyl acetamide being taken as an example.

| Quantity of H₂O₂ of 30% strength, cc. | Reduced viscosity (determined in an aqueous solution of 1% strength, at 25° C.) | K value |
|---|---|---|
| 0.5 | 1.30 | 65.9 |
| 1 | 0.91 | 57.1 |
| 2 | 0.63 | 48.4 |
| 4 | 0.34 | 37.7 |

Polymerization was carried out under the following conditions: polymerization temperature 50° C.; atmosphere of nitrogen; 210 cc. of water; 90 grams of vinyl-N-methyl acetamide; 1.5 cc. of ammonia (25% strength); hydrogen peroxide added in four equal portions at intervals of 2.5 hours.

EXAMPLE 3

40 grams of N-vinyl-N-methyl propionamide were polymerized in 70 cc. of water. At the beginning of the polymerization a system comprising two phases formed. In the measure as the polymerization proceeded the organic phase vanished, so that at the end of the polymerization a clear solution of poly-N-vinyl-N-methyl propionamide in water was present. The polymerization was carried out for 12 hours at a temperature of 50° C. under an atmosphere of nitrogen while 0.5 cc. of ammonia of 25% strength and 6 times 0.1 cc. of hydrogen peroxide of 30% strength were added. The polymer had a K value of 41.7.

EXAMPLE 4

10 cc. of methanol were added at 50° C. to a mixture of 50 grams of N-vinyl-N-ethyl acetamide and 70 cc. of water. A clear solution was obtained which was polymerized under the conditions indicated in Example 3. A colourless polymer formed which had a K value of 33 and which was soluble in water and yielded a clear solution.

EXAMPLE 5

A mixture of 15 grams of N-vinyl-N-methyl acetamide and 15 grams of N-vinyl-N-methyl propionamide was polymerized at 50° C. in 70 cc. of water under an atmosphere of nitrogen while 0.5 cc. of ammonia (25% strength) and 0.5 cc. of hydrogen peroxide (30% strength) were added, the latter being added in 5 equal portions. A copolymer having a K value of 51.0 was obtained. In an analogous manner N-vinyl-N-methyl acetamide could be copolymerized with N-vinyl-N-ethyl acetamide and with N-vinyl-N-methyl-i-butyramide.

EXAMPLE 6

15 grams of N-vinyl-N-methyl acetamide and 15 grams of N-vinyl-pyrrolidone were polymerized at 50° C. in the absence of oxygen in 70 cc. of water while hydrogen peroxide and ammonia were added in a manner analogous to that described in Example 5. The copolymer obtained had a reduced viscosity of 1.90 (determined in an aqueous solution of 1% strength, at 25° C.).

EXAMPLE 7

N-vinyl-N-methyl acetamide was copolymerized with acrylonitrile in a proportion of 6:1, the copolymerization being carried out in water in the presence of a catalyst system comprising hydrogen peroxide and ammonia. A colourless polymer was obtained which in water was only capable of swelling. The copolymerization was carried out under the following conditions: 30 grams of N-vinyl-N-methyl acetamide and 5 grams of acrylonitrile were dissolved in 70 cc. of H₂O while 0.5 cc. of ammonia (20% strength) was added. After the air had been replaced by nitrogen 0.3 cc. of H₂O₂ (30% strength) was added at a temperature of 50° C. The batch soon became thickly liquid and after some time its appearance was similar to that of gel. In order to isolate the copolymer in the solid state the water was removed after 8 hours under reduced pressure.

EXAMPLE 8

30 grams of N-vinyl-N-methyl acetamide were polymerized for 8 hours at 50° C. under an atmosphere of N₂ in 70 cc. of H₂O after 0.2 gram of hydrazine hydrate and 0.2 cc. of H₂O₂ (30% strength) had been added. A polymer having a K value of 45.4 was obtained in a yield of about 80%.

EXAMPLE 9

0.4 cc. of a monomethyl amine solution of 32% strength and 0.2 cc. of H₂O₂ of 30% strength were added at 50° C. in the absence of oxygen to a solution of 30 grams of N-vinyl-N-methyl acetamide in 70 cc. of water. After about 1 hour the beginning of the polymerization could be perceived by an increase of the viscosity of the solution. The colourless polymer which formed could be obtained in usual manner after a polymerization period of 8 hours in the solid state.

We claim:

1. Process for the production of polymers of N-vinyl-amides of the formula

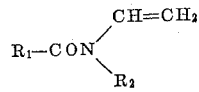

wherein $R_1$ and $R_2$ each represent a member selected from the group consisting of monovalent radicals of saturated aliphatic hydrocarbons containing 1 to 5 carbon atoms and a hydrogen radical, which comprises the step of polymerizing at least one of said N-vinylamides at a temperature within the range of 0° C. to 100° C. in the presence of a catalyst system comprising 0.0001 to 10% by weight, calculated on the monomer, of $H_2O_2$ and 0.0001 to 10% by weight, calculated on the monomer, of at least one member selected from the group consisting of an inorganic nitrogen-containing compound giving a basic reaction and an organic nitrogen-containing compound giving a basic reaction.

2. A process as claimed in claim 1 wherein N-vinyl-N methyl acetamide is polymerized.

3. Process for the production of polymers of N-vinyl-amides of the formula

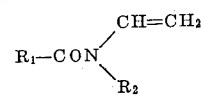

wherein $R_1$ and $R_2$ each represent a member selected from the group consisting of monovalent radicals of saturated aliphatic hydrocarbons containing 1 to 5 carbon atoms and a hydrogen radical which comprises the step of polymerizing at least one of said N-vinylamides together with another monomer capable of being polymerized under the action of a free radical polymerization catalyst, at least 10%, calculated on the total weight of the mixture, consisting of N-vinylamides, at a temperature within the range of 0° C. to 100° C. in the presence of a catalyst system comprising 0.0001 to 10% by weight, calculated on the monomer, of $H_2O_2$ and 0.0001 to 10% by weight, calculated on the monomer, of at least one member selected from the group consisting of an inorganic nitrogen-containing compound giving a basic reaction and an organic nitrogen-containing compound giving a basic reaction.

4. Process for the production of polymers of N-vinyl-amides of the formula

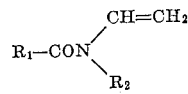

wherein $R_1$ and $R_2$ each represent a member selected from the group consisting of monovalent radicals of saturated aliphatic hydrocarbons containing 1 to 5 carbon atoms and a hydrogen radical, which comprises the step of polymerizing at least one of said N-vinylamides together with acrylonitrile, at least 10%, calculated on the total weight of the mixture, consisting of N-vinylamides, at a temperature within the range of 0° C. to 100° C. in the presence of a catalyst system comprising 0.0001 to 10% by weight, calculated on the monomer, of $H_2O_2$ and 0.0001 to 10% by weight, calculated on the monomer, of at least one member selected from the group consisting of an inorganic nitrogen-containing compound giving a basic reaction and an organic nitrogen-containing compound giving a basic reaction.

5. Process for the production of polymers of N-vinylamides of the formula

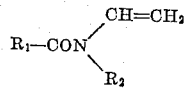

wherein $R_1$ and $R_2$ each represent a member selected from the group consisting of monovalent radicals of saturated aliphatic hydrocarbons containing 1 to 5 carbon atoms and a hydrogen radical, which comprises the steps of polymerizing at least one of said N-vinylamides at a temperature within the range of 0° C. to 100° C. in the presence of a catalyst system comprising 0.0001 to 10% by weight, calculated on the monomer, of $H_2O_2$ and 0.0001 to 10% by weight, calculated on the monomer, of ammonia.

6. Process for the production of polymers of N-vinylamides of the formula

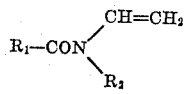

wherein $R_1$ and $R_2$ each represent a member selected from the group consisting of monovalent radicals of saturated aliphatic hydrocarbons containing 1 to 5 carbon atoms and a hydrogen radical, which comprises the step of polymerizing at least one of said N-vinylamides at a temperature within the range of 0° C. to 100° C. in the presence of a catalyst system comprising 0.0001 to 10% by weight, calculated on the monomer, of $H_2O_2$ and 0.0001 to 10% by weight, calculated on the monomer, of hydrazine.

7. Process for the production of polymers of N-vinylamides of the formula

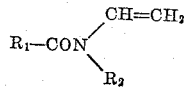

wherein $R_1$ and $R_2$ each represent a member selected from the group consisting of monovalent radicals of saturated aliphatic hydrocarbons containing 1 to 5 carbon atoms and a hydrogen radical, which comprises the step of polymerizing at least one of said N-vinylamides at a temperature within the range of 0° C. to 100° C. in the presence of a catalyst system comprising 0.0001 to 10% by weight, calculated on the monomer, of $H_2O_2$ and 0.0001 to 10% by weight, calculated on the monomer, of at least one primary aliphatic monoamine containing 1 to 5 carbon atoms.

References Cited by the Examiner

UNITED STATES PATENTS

| | | | |
|---|---|---|---|
| 2,231,905 | 2/1941 | Hanford et al. | 260—89.7 |
| 2,335,454 | 11/1943 | Schuster et al. | 260—88.3 |
| 2,462,678 | 1/1949 | Roedel | 260—89.7 |
| 2,552,327 | 5/1951 | Kropa | 260—89.7 |
| 2,687,403 | 8/1954 | Ballard et al. | 260—89.7 |
| 2,856,338 | 10/1958 | Grosser | 204—158 |

OTHER REFERENCES

Chemical Abstracts, 54, col. 13097g (1960).

JOSEPH L. SCHOFER, *Primary Examiner.*

LEON J. BERCOVITZ, W. HOOVER, W. G. GOODSON, *Assistant Examiners.*